(12) United States Patent
Agarwal

(10) Patent No.: US 11,037,200 B2
(45) Date of Patent: Jun. 15, 2021

(54) SYSTEM AND METHOD OF PROVIDING AUGMENTED REALITY CONTENT WITH A DISTRIBUTION ITEM

(71) Applicant: United States Postal Service, Washington, DC (US)

(72) Inventor: Sachin Agarwal, Washington, DC (US)

(73) Assignee: UNITED STATES POSTAL SERVICE, Washington, DC (US)

(*) Notice: Subject to any disclaimer, the term of this patent is extended or adjusted under 35 U.S.C. 154(b) by 0 days.

(21) Appl. No.: 15/845,120

(22) Filed: Dec. 18, 2017

(65) Prior Publication Data

US 2018/0174195 A1 Jun. 21, 2018

Related U.S. Application Data

(60) Provisional application No. 62/508,898, filed on May 19, 2017, provisional application No. 62/435,656, filed on Dec. 16, 2016.

(51) Int. Cl.
*G06Q 30/02* (2012.01)
*G06K 9/00* (2006.01)
*G06T 19/00* (2011.01)

(52) U.S. Cl.
CPC ..... *G06Q 30/0267* (2013.01); *G06K 9/00671* (2013.01); *G06Q 30/0261* (2013.01); *G06T 19/006* (2013.01)

(58) Field of Classification Search
None
See application file for complete search history.

(56) References Cited

U.S. PATENT DOCUMENTS

| 2010/0309226 | A1* | 12/2010 | Quack | G06F 17/30244 345/634 |
| 2014/0058812 | A1* | 2/2014 | Bender | G06Q 30/0209 705/14.12 |
| 2014/0095497 | A1* | 4/2014 | Howe | G06F 16/29 707/736 |
| 2014/0243650 | A1* | 8/2014 | Oren | A61B 5/064 600/407 |
| 2014/0247123 | A1* | 9/2014 | Batterson | G06Q 10/0836 340/539.11 |
| 2014/0253743 | A1* | 9/2014 | Loxam | H04N 5/232 348/207.1 |
| 2015/0153571 | A1* | 6/2015 | Ballard | H04W 76/10 345/8 |
| 2017/0169031 | A1* | 6/2017 | De Barros | H04L 67/02 |
| 2018/0107805 | A1* | 4/2018 | Anantharaman | G06F 3/16 |

* cited by examiner

*Primary Examiner* — Jennifer Mehmood
*Assistant Examiner* — Jed-Justin Imperial
(74) *Attorney, Agent, or Firm* — Knobbe, Martens, Olson & Bear LLP

(57) ABSTRACT

Systems and methods for providing digital augmented reality content in a distribution network using physical distribution items as triggers for the Augmented reality content. An interface allows a sender of a physical item to provide augmented reality content to a distribution network, and the distribution network can provide the augmented reality content to a recipient of the physical distribution item.

23 Claims, 3 Drawing Sheets

SYSTEM AND METHOD OF PROVIDING AUGMENTED REALITY CONTENT WITH A DISTRIBUTION ITEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/435,656, filed Dec. 16, 2016, and U.S. Provisional Application No. 62/508,898, filed May 19, 2017.

BACKGROUND

Field

The present disclosure relates to systems and methods for providing augmented reality content for distribution items.

Description of the Related Art

Augmented reality is a way to display real-world environment or images augmented or supplemented by computer generated content, such as video, sound, and interactive experiences. Augmented reality content can be provided on a mobile computing device, such as a smartphone or a tablet computer, and may use or often uses the built-in camera or optical functionality of the mobile computing device.

BRIEF DESCRIPTION OF THE DRAWINGS

In one aspect described herein, an augmented reality system comprises a user interface configured to receive augmented reality content and a trigger image; a content management system in communication with the user interface, the content management system configured to receive the augmented reality content and the trigger image, and to generate and store an association between the augmented reality content and the trigger image; a mobile computing application configured to: receive the trigger image via a camera on a mobile computing device; process an image to generate trigger image information; communicate the trigger image information to the content management system; receive the augmented reality content associated with the trigger image; and display the augmented reality content on the mobile computing device.

In some embodiments, the content management system is further configured to receive the trigger image information and to identify the augmented reality content associated with the trigger image based on the received trigger image information.

Figure 1:
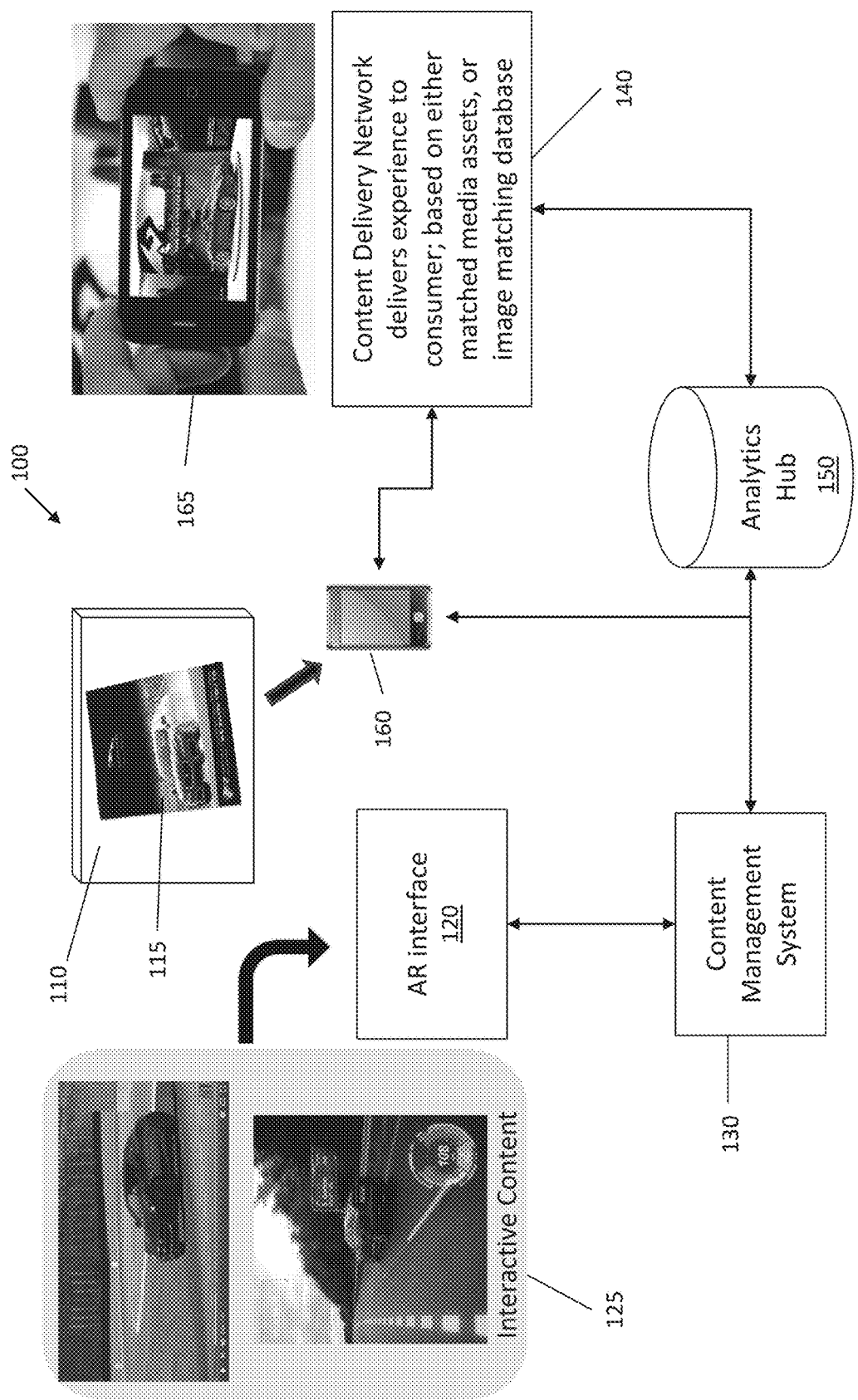

In some embodiments, the user interface is further configured to receive an additional characteristic, and the content management system is further configured to store an association between the additional characteristic and the augmented reality content or the trigger image.

In some embodiments, the mobile application is further configured to receive an additional characteristic from the mobile computing device.

In some embodiments, the content management system is further configured to receive the additional characteristic from the mobile application, and to identify the augmented reality content associated with the trigger image based on the received additional characteristic.

In some embodiments, the additional characteristic is the geographic location of the mobile computing device when the trigger image is received.

In some embodiments, the system further comprises an analytics hub in communication with the content management system and the mobile application, the analytics hub configured to receive augmented reality interaction information. In some embodiments, the system comprises a physical distribution item having the trigger image thereon, and wherein the mobile application is configured to receive the trigger image by imaging the physical distribution item.

In some embodiments, the trigger image corresponds to an environmental object, and the mobile application is configured to receive the trigger image by imaging the environmental object.

In another aspect described herein, a method of providing augmented reality content comprises receiving, via a user interface, augmented reality content and a trigger image; generating an association between the augmented reality content and the trigger image; storing, in a memory, the association between the augmented reality content and the trigger image; receiving, in a mobile application, the trigger image; querying, by a processor, the memory to identify the augmented reality content associated with the trigger image; and providing the augmented reality content to the mobile application.

In some embodiments, the method comprises processing the trigger image to generate trigger image information, and wherein querying the memory comprises querying the memory using the generated trigger image information to identify a corresponding trigger image and associated augmented reality content.

In some embodiments, the method further comprises receiving, via the user interface, an additional characteristic, and storing, in the memory, an association between the additional characteristic and the augmented reality content or the trigger image.

In some embodiments, the mobile application is further configured to receive an additional characteristic from a mobile computing device on which the mobile application is running.

In some embodiments, the method further comprises receiving the additional characteristic from the mobile application, and identifying the augmented reality content associated with the trigger image based on the received additional characteristic.

In some embodiments, the additional characteristic is the geographic location of the mobile computing device when the trigger image is received.

In some embodiments, the method further comprises generating augmented reality interaction information from the mobile application.

In some embodiments, the method further comprises delivering a physical distribution item having the trigger image thereon, and wherein receiving the trigger image comprises receiving an image of the physical distribution item.

In some embodiments, the trigger image corresponds to an environmental object, and wherein receiving the trigger image comprises receiving an image of the environmental object.

In some embodiments, the environmental object is a postal collection box.

In another aspect described herein, a system for providing augmented reality content comprises means for receiving augmented reality content and a trigger image; means for generating an association between the augmented reality content and the trigger image; means for storing the association between the augmented reality content and the trigger image; means for receiving the trigger image; means for querying the memory to identify the augmented reality content associated with the trigger image; and means for providing the augmented reality content to the mobile application.

BRIEF DESCRIPTION OF THE DRAWINGS

FIG. 1 is a block diagram of a system for providing augmented reality content based on a distribution item.

Figure 2:
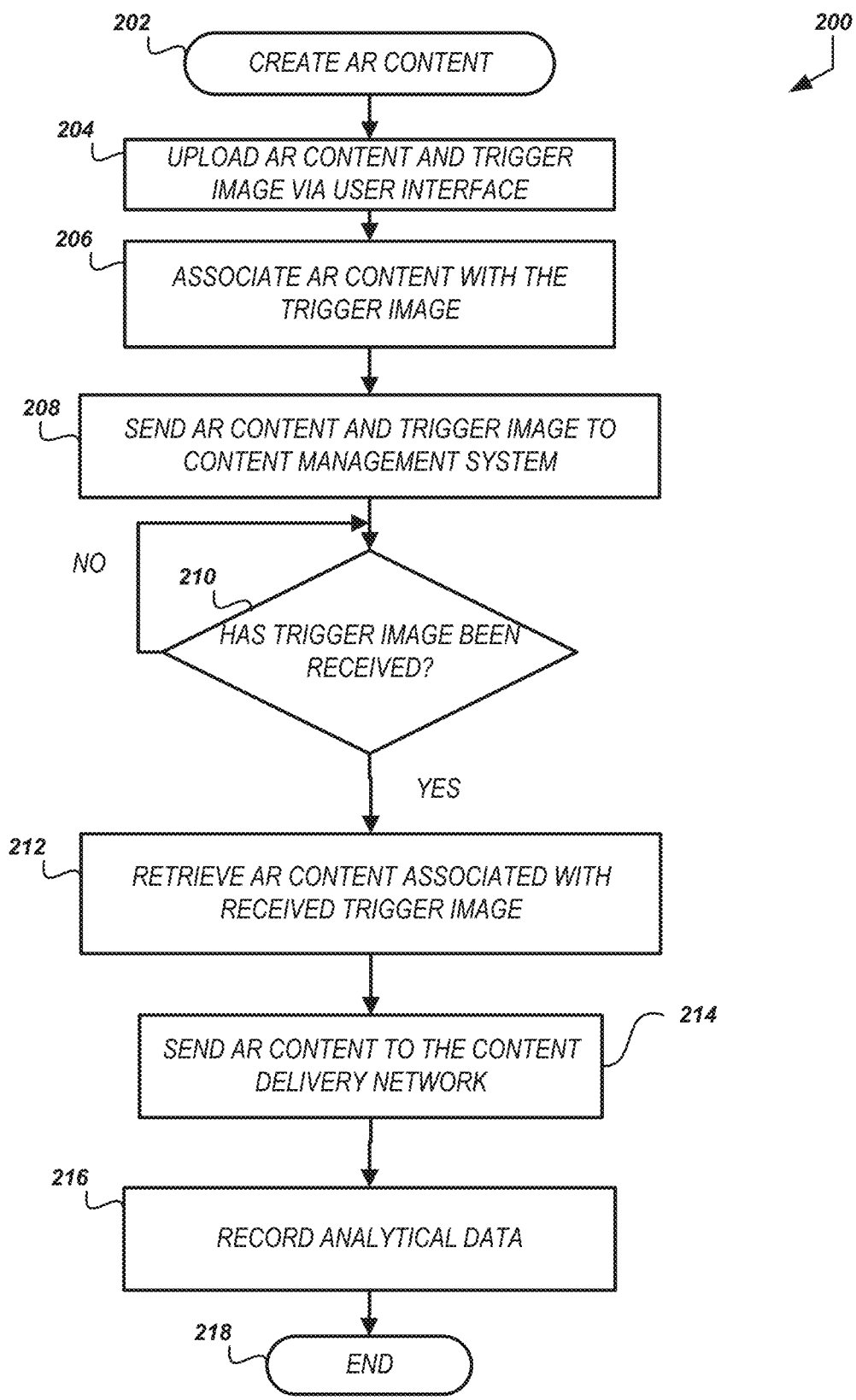

FIG. 2 is a flow chart depicting an exemplary process for providing augmented reality content.

Figure 3:
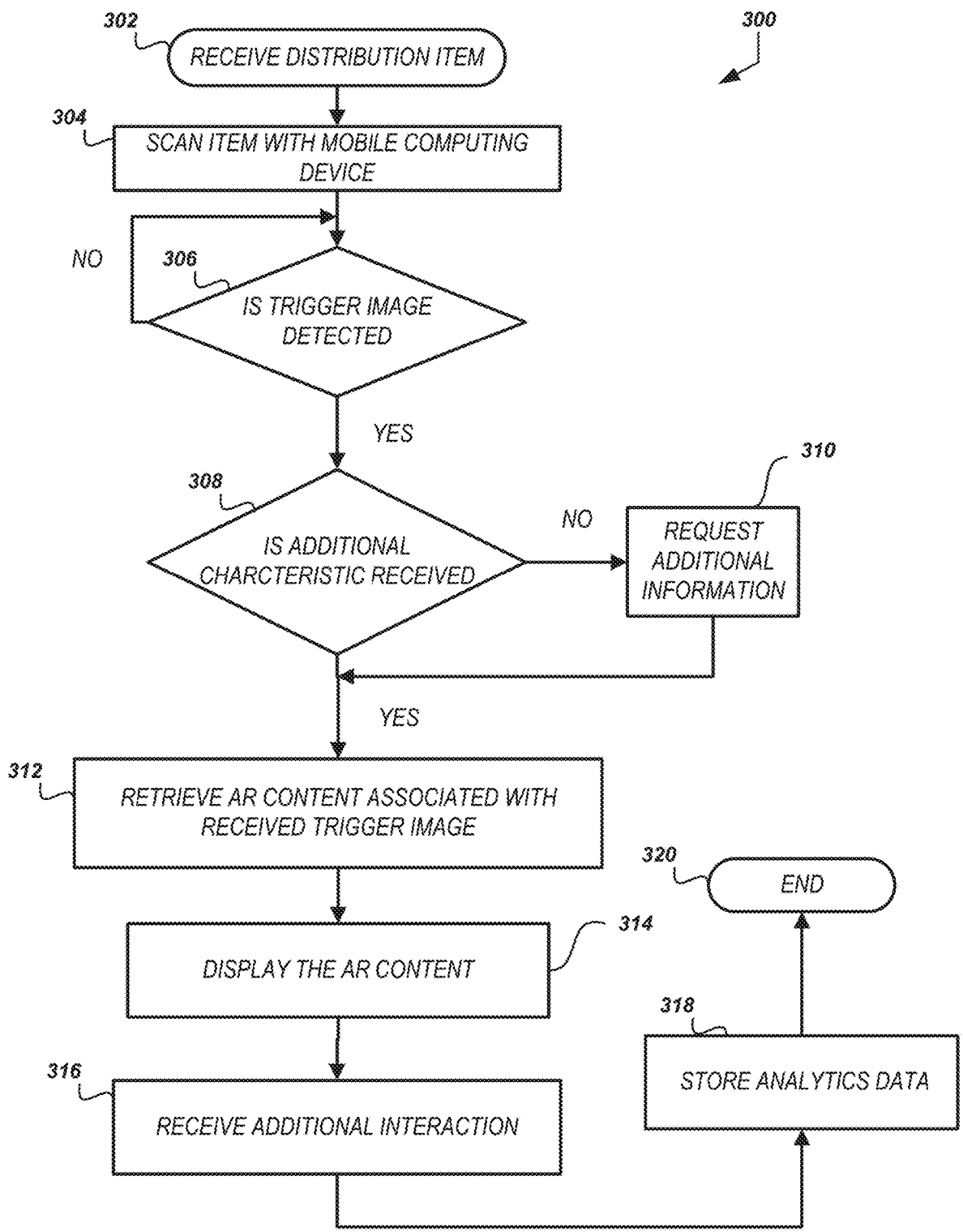

FIG. 3 is a flow chart depicting an exemplary process for receiving augmented reality content.

DETAILED DESCRIPTION

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As mobile computing devices, such as smartphones, are commonplace, digital content, including augmented reality content, can be provided to most people. A distribution network can provide augmented reality content to a recipient of a distribution item to enhance the recipient's experience of the distribution item. A sender of a distribution item can provide additional content that can be triggered by the distribution item. The additional augmented reality content can relate to the subject matter of the distribution item, the sender, the trigger image, a computer readable code on the distribution item, a Bluetooth or RF signal from a transmitter or reflector embedded within the distribution item, or other similar feature of the item. The additional augmented reality content can be video, audio, 3D images, interactive content, and the like. In some embodiments, the augmented reality content can be computer generated icons, animations, images, or text that overlay the real-time images being viewed through the camera on a smartphone. In some embodiments, the additional content can be virtual reality content or holographic image content.

The augmented reality content can include options for additional services, ordering, requesting, and purchasing items, products, and the like associated with the subject matter of the distribution item. The mobile computing device on which the augmented reality content is accessed can record data relating to the viewing of the augmented reality content. This will be described in greater detail below.

As used herein, the term distribution item may refer to discrete articles in a distribution network, such as mailpieces, letters, flats, magazines, periodicals, packages, parcels, or any other mobile or portable item that can be shipped from one location to another. The term item can also refer to trays, containers, conveyances, crates, boxes, bags, and the like. As used herein, the term distribution network can refer to a warehousing facility, a fulfillment center, a courier service, a commercial carrier, a postal service, or any other entity or organization involved in the movement, shipment, and/or transportation of distribution items.

FIG. 1 depicts a block diagram of a system 100 for providing augmented reality (AR) content based on a distribution item 110. The system 100 comprises an AR interface 120, a content management system 130, a content delivery network 140, and an analytics hub 150. Each component of the system 100 can be in wired or wireless communication with each other part of the system 100. The content delivery network 140 is in wireless communication, such as via Wi-Fi, Bluetooth, ZigBee, 802.11x, 3G, 4G, LTE, cellular, RF, or other wireless communication method or protocol, with a mobile computing device 160. The mobile computing device 160 can be a smartphone, tablet computer, or other similar device.

The AR interface 120 comprises an interface, such as an API, a website, an application, a software-based interface, where a sender of the distribution item 110 can provide AR content 125 to the content management system 130. The AR interface 120 can be accessed by a mailer, a sender of the distribution item 110, a retailer, a shipper, or any other entity which puts an item into the distribution network. The AR interface 120 allows AR content 125 to be uploaded to the content management system 130 so the AR content 125 can be displayed on the mobile computing device 160. The AR content 125 can include video, audio, computer code to be executed on the mobile computing device 160, 3D graphics, overlays, links, interactive features, and any other desired AR experience.

The sender of the distribution item, or the entity accessing the AR interface 120, can also upload the trigger image 115 which triggers the AR content 125 to be displayed on the AR interface, such as a smartphone. The trigger image 115 can be an image, a computer readable code, such as a 1D or 2D barcode, a QR code, or an alphanumeric string. In some embodiments, the trigger image 115 is a picture of the distribution item 110. The trigger image 115 can be a particular environment, such as an image of an actual location, which can be recognized by the content delivery network 140 and the content management system 140. For example, the trigger image 115 may be an image of a car dealership, or other business proving the distribution item 110. As the recipient of the distribution item 110, using instructions on the distribution item, takes an image of the actual car dealership or other business, the AR content 125 can be delivered to the recipient's mobile computing device 160.

In some embodiments, the AR content 125 is accessed in response to receiving the trigger image 115 and an additional characteristic, such as a geographic location, a Bluetooth low energy (BLE) type connection, information from an application or the mobile computing device, or another similar input. For example, the AR content 125 may be regionally targeted or region specific. If the corporate headquarters for Ford wanted to advertise nationwide, Ford may send a single mailer to each state in the country, with a common target image 115. The AR content 125, however, may be regionally targeted. So, upon receipt of the target image 115, along with a geographic location for a specific place, the target image 115 and the geographic location information will trigger a particular AR content 125. So, if a person in New York scans the Ford mailpiece, the person in New York will see AR content 125 which is tailored with information or deals related to a New York-based Ford dealership. These processes will be described in greater detail below.

In some embodiments, the additional characteristic can be a Bluetooth pairing with a device associated with the distribution entity, such as a carrier vehicle, a carrier device, a Bluetooth enabled mailbox, and the like. In some embodiments, the distribution item 110 may have a BLE chip therein which can pair with the mobile computing device 160. The AR content 125 provided to the mobile computing device 160 can depend on the satisfaction of the additional characteristic, or depend on details of the additional characteristic, including the identity of the BLE device to which it is paired. In some embodiments, if the additional characteristic is not satisfied, the AR content 125 will not be provided.

In some embodiments, the additional characteristic can be a recipient identifier obtained from the mobile computing device 160 or the application running thereon. This can be a mobile telephone number, login credentials, or other unique identifier. The unique identifier can be associated with a recipient's name and other individual information in the content management system 130 or the content delivery network 140. This individual information can be made available to the content delivery network 140 or the distribution network on an opt-in basis. The individual information can be used by the content management system 130 to customize or personalize the AR content 125 to the individual recipient.

The content management system 130 can comprise a processor (not shown) and a memory (not shown). The content management system 130 is in communication with the AR interface in order to receive the AR content 125 and the trigger image 115. The content management system 130 is operated and/or controlled by the distribution network who transports, ships, or delivers the distribution item 110. An exemplary distribution network can be the United States Postal Service (USPS). The content management system 130 controls the flow of information, data, images, and the like among the components of the system 100.

The content delivery network 140 can be a computer network, such as a cellular network, a Wi-Fi network, or any other communications network capable of communicating with a mobile computing device 160. The content delivery network 140 is in wireless communication with the mobile computing device 160 and is in wired or wireless, or both, communication with the content management system 130.

In some embodiments, the content delivery network 140 can be a distributed network, and can utilize resources of the distribution network. In the example of the United States Postal Service, carrier vehicles, mobile devices, post offices, drones, and other similar resources can be part of the content delivery network 140. This can allow a recipient to access content from the content management system 130 via a nearby carrier vehicle or post office, without needing to use cellular data. For example, the carrier vehicles, carriers' mobile devices, post offices, drones, etc., and be access points to a wireless network for providing the AR content 125. When a recipient's mobile computing device 160 is within range of a vehicle or device which is an access point, the access point can authenticate the mobile computing device 160 or identify that the mobile computing device is viewing a distribution item 110 having a trigger image 115, or is broadcasting a trigger image 115 from a mobile application. The vehicle or device with the access point can receive the trigger image 115, or information indicative of the trigger image 125, request the AR content 125 from the content management system 130, and provide the AR content 125 to the recipient's mobile computing device 160. The AR content 125 can be delivered by more than one delivery resource, either simultaneously or in series, and the can transition from one to another, and to the mobile computing device's network, as vehicles and/or carriers move in and out of the vicinity of the mobile computing device 160.

The analytics hub 150 can comprise a processor and a memory and be in communication with the content management system 130, the content delivery network 140, and the mobile computing device 160. In some embodiments, the analytics hub 150 can be an application or software module running on the content management system 130. The analytics hub receives information from the mobile computing device 160, either directly or from the content delivery network 140, and compiles analytics. The analytics hub 150 can then provide the analytics to the AR interface 120 and the content management system 130 for viewing or use by the distribution network and/or the sender of the distribution item 110.

The system 100 allows for a sender of the distribution item 110 to obtain analytics information. As the recipient interacts with the mobile computing device 160 during the AR experience, the analytics hub 150 gathers information regarding the recipients behavior and can transmit this information to the content management system 130, where it can be made available to the sender of the distribution item 110, via the AR interface 120. The analytics and recipient behavior information can include a report that the recipient clicked or tapped on a link, the nature of the interaction, how long the recipient interacted with the AR content 125, whether any links to external sites were followed, whether purchases were made or orders placed from the AR content 125 or during the AR experience 165. The information gathered can be aggregated and made available to providers of AR content, mailers, or another entity.

The analytics hub 150 can store the information gathered, and can include modules which analyze the received data and provide reports. The distribution network can specify what analysis is done and offer the analysis to the sender of the distribution item 110 via the AR interface 120. In some embodiments, the content management system 130 can allow a sender access to the gathered and aggregated analytics data via the AR interface 120. The AR interface 120 can provide an API for senders to selectively access data related to the sender's distribution item.

The analytics hub 150 can provide information such the number of items having the trigger image 115 thereon were sent, the number of times the AR content 125 was accessed for a distribution item 110; the number and/or percent of views of the AR content 125; the number and/or percent of views of the AR content 125 that led to an external site, to a purchase, and the like; the duration of interaction with the AR content 125; the location of the recipient during the AR experience 165; identifying information the recipient voluntarily provided during download/installation of the AR application; the number or percent of users who shared the AR content 125 via a social media platform, via an electronic message, and the like; and any other desired information which can be discerned from the data gathered at the analytics hub 150.

The analytics hub 150 can gather and aggregate information about particular AR content 125, such as campaign effectiveness or reach. For example, a sender, a company, mailer, or other entity can upload multiple trigger images 115 and associated AR content 125 to the content management system 130. The analytics hub 150 can compare the effectiveness of the multiple trigger images 115 and provide analytics regarding how many views, clicks, etc., each of the multiple trigger images 115 generated, which trigger images 115 were viewed within a specified time period from delivery of the item, which trigger images 115 resulted in request for further information, which trigger images 115 resulted in a purchase, and other desired analytics information.

In some embodiments, the data gathered at the analytics hub 150 can be used to create an organization, table, database, or the like of email addresses, logins, digital handles, social media handles, and the like, and associate these with the physical address of a recipient. This determination can be done using the GPS data or provided address of a recipient during an AR interaction with the distribution item 110.

The system 100 can be used as a bridge from the physical distribution item to a digital experience. Marketers can capitalize on the tactile benefits of print to capture attention of their audience and then use AR to bring customers into their digital marketplace. It is vital that the vendor can show a synergy with print and their digital technology that adds value to a marketing campaign. This includes functionality including but not limited to: image decomposition, content hosting for both internal and third-party AR experiences, content management for both the distribution network and for third-parties, integration with existing systems, "ringfence" data environments as per privacy requirements. The system 100 includes the ability to perform image decomposition for conducting image recognition on provided images, for facial recognition, object recognition, and environment recognition. The image processing performed in the AR interface 120 and/or the content management system 130 is able to convert recognized images into easily manipulateable metadata and requires low to no human involvement to run Image Decomposition. The content management system 130, or other component of the system 100 can use image recognition to determine the image location from contextual clues and/or from metadata transmitted with the image. The AR content 125 provided to the mobile computing device 160 can be video, including loop functionality, websites, 3D immersive environments, predefined and custom templates for interactive content. The AR application on the mobile computing device 160 can display 2D and 3D overlays on surrounding objects visible through the camera or viewfinder to show individuals how to interact with objects, equipment, and the environment.

The AR content 125 can provide AR experiences based on geospatial information. For example; ability to scan a collection box and retrieve information regarding activity at that particular box or region (when was it picked up, closest post office, predicted pick-up time, etc.) without having to leave the AR experience. The analytics hub 150 can gather analytics data and the content management system 130 can provide senders analytics information on an individual distribution item level, on a campaign level, on a sender level, or at any other desired level. The analytics data gathered and stored in the analytics hub can include, for example: percentage of clickthroughs and number of distribution items in campaign, the number of clickthroughs that lead to purchases or conversions, the number of customer shares of the AR content 125 or information related to the AR content 125, including sharing performed within the AR content 125 itself; duration of interaction with content; location that user interacted with distribution item; time: date and hour of day; scans of distribution item (sender); markers (if sender has more than a marker); country, state, city, and zip code; user mobile computing device, e.g. device OS, version, language, etc. The trigger images 115 can be still images, QR codes, bar codes, BLE connections, and the like.

A process 200 of providing an AR experience 165 to the mobile computing device 160 will now be described with reference to FIG. 2. In block 202, sender who wishes to provide an AR experience 165 to a recipient of a distribution item 110 creates the AR content 125. Creating the AR content can include creating the content to be provided and selecting the trigger image 115. The trigger image 115 is also provided on the physical distribution item 110. In some embodiments, the trigger image 115 can be an image of the distribution item 110 that will be inducted into the distribution network. In some embodiments, the trigger image 115 can be a computer readable code. The process 200 moves to block 204, where the sender accesses the AR interface 120 and uploads the AR content 125 and the trigger image 115.

The sender of the distribution item 110 can also into the distribution network, for example, when the physical item 110 will be inducted into the mailstream. For example, the sender may provide the AR content 125 as the distribution item 110 is inducted. In some embodiments, the sender of the distribution item 110 can provide a date or time at which the AR content 125 should become active or available for viewing on the mobile computing device 160.

In some embodiments, the sender of the distribution item 110 provides an additional characteristic, such as an identification of a geographic region to the AR interface 120, which will be used in conjunction with the trigger image 115, as described elsewhere herein.

For example, as depicted in FIG. 1, the AR content is a video of a car driving along a road or test track. The trigger image 115 is a picture of a car. The distribution item 110 can be direct marketing mail, targeted mail, advertising brochure, a catalog, or the like. The trigger image 125 is printed on the distribution item 110.

The process 200 moves to block 206, wherein the content management system 130 associates the trigger image 115 with the AR content 125. The process 200 moves to block 208, wherein the AR content 125, the trigger image 115, and the associate are provided to and stored the content management system 130. In some embodiments, the AR content 125 and the trigger image and the associate are stored remote from the content management system 130, but are accessible to the content management system 130.

The sender of the distribution item 110 provides the physical distribution item 110 having the trigger image 115 thereon to the distribution network. The distribution network delivers the distribution item 110 to the recipient.

Process 200 moves to decision state wherein it determine whether the trigger image has been received from the mobile computing device 160, either directly or via the content delivery network 140. If the trigger image 115, information indicative of the trigger image 115, or another signal indicating that the trigger image 115 was scanned, is received in the content management system 130, the process 200 moves to block 212, wherein the content management system 130 identifies the AR content 125 associated with the trigger image 115.

If no trigger image has been received, the process 200 returns to decision state 210, waiting until a trigger image is received. The process moves to block 214, wherein the content management system 130 sends the AR content 125 to the content delivery network 140, which can provide the AR content 125 to the mobile computing device. In some embodiments, the content delivery network 140 provides the AR content 125 to the mobile computing device 160 which scanned and sent the trigger image 115.

The process 200 moves to block 216, wherein the analytics hub 150 gathers analytical information. The analytics hub 150 gathers and records information, events, locations, dates, times, and other parameters throughout the process. For example, the analytics hub 150 receives signals from the AR application running on the mobile computing device 160, from the content delivery network 140, and the content management system 130.

For example, when a sender of a distribution item uploads AR content 125 via the AR interface 120, a date/time stamp may be transmitted to the analytics hub 150 via the content management system 130, or directly to the analytics hub 150, and stored there. When a recipient scans the distribution item 110 with the mobile computing device, the AR application can send information to the analytics hub 150 either directly or via the content delivery network 140. The information from the AR application can include a user identifier, such as a user name, login information, a phone number, email address, home address, application identifier, device identifier (such as an ESN, MEID, IMEI from a smartphone), or other information. This information can be gathered when the AR application is downloaded or installed on the mobile computing device 160.

The process 200 ends in block 218.

A process 300 depicts a process for receiving AR content 125. The process 300 begins in block 302, when a recipient receives a distribution item 110 having a trigger image 115 thereon or associated therewith. The recipient receives the distribution item 110, for example, the mailpiece having the trigger image 115 thereon, via the distribution network. The distribution item 110 may also have a notification thereupon informing the recipient that there is AR content 125 associated with the distribution item 110.

The process 300 moves to block 304, wherein the recipient scans the distribution item 110 with the mobile computing device 160. The recipient uses a mobile computing device 160 to scan the distribution item 110 and the trigger image 115. The mobile computing device 160 can run an application, such as an AR application to access the AR content 125. The AR application is configured to operate the camera or other optics of the mobile computing device 160. For example, the recipient points the camera of the mobile computing device 160 at the distribution item 110 to scan the trigger item 115. The mobile computing device 160 can transmit an image, or information indicative of an image to the content management system 130, such as via an application running on the mobile computing device 160. The AR application on the mobile computing device 160 can capture the trigger image 115 and recognize and/or identify the trigger image 115 on the distribution item 110.

The process 300 moves to decision state 306, wherein it is determined if the trigger image 115 is detected. The AR application on the mobile computing device 160 can be configured to recognize and/or identify the trigger image 115 locally on the mobile computing device 160. In some embodiments, the AR application can perform an image decomposition function to obtain decomposed image data which is sent to the content management system 130. In some embodiments, the AR application can use the communication capability of the mobile computing device to send the images captured by the camera on the mobile computing device 160, or decomposed image information, to the content management system 130 via the content delivery network 140. The recognition or identification of the trigger image 115 can be done in the processor of the content management system 130. If no trigger image 115 is detected, the process returns to decision state 306, and awaits receipt of the trigger image 115.

If the trigger image 115 is recognized as an image that was uploaded via the AR interface 120, the process 300 moves to decision state 308, wherein it is determined whether an additional characteristic is received. As described elsewhere herein, the additional characteristic can determine which of a variety of AR content 125 associated with a trigger image 115 should be provided, or it can determine whether the AR content 125 should be provided. The additional characteristic can be a recipient specific identifier, such as a mobile number, which allows for personalization of the AR content 125. If an additional characteristic is not received, the process 300 moves to block 310, wherein additional information is requested. The additional information requested can correspond to the additional characteristic. For example, the system 100 may request additional information regarding geographic location of the mobile computing device 160, individual information, and the like. The process 300 then moves to block 312.

If the additional characteristic is received, the process 300 moves to block 312, wherein the content management system 130 identifies the AR content 125 associated with the trigger image and, in some embodiments, with the additional characteristic. A person of skill in the art will understand that the process 300 may or may not require an additional characteristic, and that blocks 308 and 310 can be omitted without departing from the scope of the present disclosure.

The content management system 130 identifies the AR content 125 based on the previously stored association between the AR content 125 and the trigger image 115 received from the mobile computing device 160, modified as required according to the additional characteristic. The AR content 125 is provided to the content delivery network 140, and the mobile computing device 160 receives the AR content 125 from the content delivery network 140. In some embodiments, the AR content 125 can be received from the content management system 130 or via another interposed system, without departing from the scope of the present disclosure.

The process 300 moves to block 314 wherein the mobile communications device 160 displays the AR content 125, for example, via the AR application. The content management system 130 provides the AR content 125 to the mobile computing device via the content delivery network 140. The AR content 125 is then viewed by the recipient as the AR experience 165. As an example, as shown in FIG. 1, the recipient points the mobile computing device 160 at the distribution item 110 and views the trigger image 115 of the car. When the trigger image is recognized, the AR content 125 is displayed. The car in the image on the mobile computing device 125 may appear to move and begin driving against the background visible through the camera of the mobile computing device 160.

The AR content 125 can include interactive features, links to order additional products, and the like. As the recipient of the distribution item 110 interacts with the AR content 125, the application on the mobile computing device 160 may request additional content from the content management system 130. In some embodiments, the application may direct the mobile computing device 160 to websites or other locations on the internet.

If one of the interactive features is selected, the process 300 moves to block 316, wherein the additional interaction is received, and a request for additional content is sent. The recipient can then view the additional content related to the AR content 125. The additional content can include a web address, an order form, interactions within the AR content 125 itself that direct the display of interactive content, and the like.

The process moves to block 318, wherein the analytics data, including whether the recipient provide and additional interaction or tapped on an interactive feature, and the analytics data is stored in the analytics hub 150. For example, when the AR application is used to scan a distribution item 110, the AR application can send user information as described above, and can send date/time information and location information corresponding to the date, time, and geographic location of the recipient when the AR application scanned the distribution item 110 and when the recipient accessed the AR content, and any additional links, views, clicks, shares, purchases or other activities the user performed in response to the AR content. This information is sent to the analytics hub 150.

The process 300 then ends in block 320.

In addition to using the AR system 100 with physical distribution items 110, in some embodiments, the AR application can also be used by a recipient, carrier, or other party on the mobile computing device 160 at a designated or specific location, or in an interaction with an object other than a physical distribution item. The designated or specific location can be uploaded to the AR interface 120 to be recognized as a trigger image 115. When such a trigger image 115 is identified, the AR application can provide overlays, video, audio, or other indication of events that have happened or will happen at that location. For example, an image of a postal collection box, a mail box, or other similar receptacle can be the trigger image 115. When a recipient or carrier scans the receptacle with the AR application, the content management system 130 can recognize the trigger image 115 as a postal collection box, and can obtain the geographic location of the mobile computing device 160 which is viewing the trigger image 15. The content management system 130 can provide AR information about activity, such as pick up status, time of pick up, the closest post office, or other desired information about that location, which can be displayed on the mobile computing device 160. In some embodiments, the postal collection box may turn red if there are no further pickups for the day, or may be green if the postal collection box contents have not yet been picked up. This AR information can be uploaded via the AR interface 120, or can be requested by the content management system 130 from other systems of the distribution entity.

In some embodiments, the sender of the distribution item 110, an advertiser, a mailer or other entity can provide AR content 125 to the content management system 130 which is part of an campaign, and can include multiple trigger images 115 and multiple types of AR content. For example, a car manufacturer may create an AR content campaign. The corporate car manufacturer or headquarters can request to create an AR content campaign with the distribution network. The distribution network may assign an account number or an identifier to the car manufacturer which will be associated with the campaign. The car manufacturer may provide details regarding the campaign, such as whether there will be geography-based content, such as different AR content 125 for different geographic areas, etc. If there are multiple versions of AR content for a single AR content campaign, the AR interface 120 may assign more than one identifier to the car manufacturer, with one or more identifiers corresponding to a geographic region.

The car manufacturer can upload the AR content 125 to the content management system, including multiple versions or different versions of the trigger image 115 and/or AR content 125 and associate those with the identifiers for different geographic regions. In some embodiments, the car manufacturer can provide the account number or identifier or identifiers to franchisees, local dealers, etc. The franchisees or local dealers in specific geographic areas can access the AR interface 120, provide the account number or identifier for their geographic area, and upload specific AR content 125, such as content advertising or relating to the local franchise or dealership.

When a recipient scans the item 110 and a trigger image 115 on the item, and when the mobile computing device 160 provides a geographic location, the content management system determines which version or type of AR content 125 to deliver based on the geographic location. Where a franchisee or local dealership uploaded AR content 125, the content management system 130 provides the location specific AR content 125, and provides the specific AR content 125 to the content delivery network 140.

This example describes how a car manufacturer and local dealers can provide AR content 125. A person of skill in the art, guided by this disclosure, would understand that the concepts here could be applied to other industries, entities, corporations, and the like.

In some embodiments, the AR content 125 can be visual directions or overlay pointing to, providing directions to, or simply highlighting a particular location. For example, a coffee shop may provide an item 110 and a trigger image 115. The trigger image 115 is provided to the content management system 130 and stored. The AR content 125 provided can be visual instructions, and/or map directions to the mobile computing device 160 to identify the nearest coffee shop location to where the mobile computing device 160 is located. The AR content 125 can provide instructions to the mobile computing device to place a video overlay of the coffee shop exterior, directions to the coffee shop, and the like. The AR content 125 in this case may instruct the mobile computing device 160 to access a third party application, like a mapping or navigation application, and use the information from that application in the AR experience on the mobile computing device 160.

In some embodiments, a movie ticket sales company can prepare or request preparation of an item 110 for distribution. The movie ticket sales company can provide a trigger image 115 to the content management system 130 and provide AR content 125 which is dependent on geographic location of the item recipient's mobile computing device 160. When a recipient scans the item 110 and the trigger image 115 with the mobile computing device 160, the AR application gathers the geographic location of the mobile computing device 160 and provides that to the content management system 130. The AR content 125 displayed can be related to the nearest theater, can be a preview for a movie playing in the geographic area, or can be other AR content 125 related to a movie-related event happening in the geographic area.

In another example, the sender of an item 110 may wish to personalize a greeting card sent to another. The sender can access the AR interface 120 and upload a trigger image 115, such as a photograph, and can upload a video message or any other AR content 125. When the recipient receives the item 110 and scans the item with his or her mobile computing device 160, the AR content 125 uploaded by the sender will be displayed when the recipient scans the greeting card with a mobile computing device 125.

The AR content 125 described herein relates to augmented reality content. In some embodiments, the content may be virtual reality content, and the term AR content 125 should not be construed as referring only to augmented reality content, but the term AR content can also refer to virtual reality content, holographic content, and the like.

For example, a magazine such as National Geographic can provide a virtual reality experience triggered by a trigger image 115 on a mailpiece, such as a magazine, or on an advertisement, etc. When the recipient scans the trigger image 115, the user is prompted to use VR hardware connected to the mobile computing device 160 to view a safari or a rainforest in a virtual reality experience.

The VR experience can be provided to the content management system 130 the same way as an augmented reality experience can be provided, as described herein. The mobile computing device 160 may have VR functionality, such as being insertable into a VR platform, or may be connected to a VR headset or other VR hardware via Bluetooth, Wi-Fi, or other communication protocol such that the mobile computing device 160 can communicate with the VR hardware. In some embodiments, the mobile computing device 160 can be VR hardware.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An augmented reality system comprising:
   a user interface configured to receive a first augmented reality content, a second augmented reality content, a trigger image, a first value of an additional characteristic associated with the first augmented reality content, and a second value of the additional characteristic associated with the second augmented reality content;
   a physical distribution item having the trigger image disposed thereon;
   a mobile computing application configured to:
      receive the trigger image via a camera on a mobile computing device;
      receive either the first or the second value of the additional characteristic from the mobile computing device;
      process the trigger image to generate trigger image information;
      communicate the trigger image information to the content management system;
      send the either the first or the second value of the additional characteristic to the content management system; and
      display either the first or second augmented reality content received from the content management system on the mobile computing device;
   the content management system in communication with the user interface and configured to:
      receive the either the first or the second value of the additional characteristic from the mobile computing application;
      if the first value of the additional characteristic is received, then identify the first augmented reality content associated therewith;
      if the second value of the additional characteristic is received, then identify the second augmented reality content associated therewith; and
      send to the mobile computing application, the identified augmented reality content; and
   a feedback loop within the content management system, the feedback loop configured to identify when the trigger image has not been received by the content management system and query the mobile computing application to input the trigger image,
   wherein the physical distribution item is selected from the group consisting of a mail piece, letter, flat, magazine, periodical, package, parcel, tray, container, conveyance, crate, box, and bag.

2. The system of claim 1, wherein the content management system is further configured to receive the trigger image information and to identify the first and second augmented reality content associated with the trigger image based on the received trigger image information.

3. The system of claim 1, wherein the content management system is further configured to identify either the first augmented reality content or the second augmented reality content based on the received value of the additional characteristic.

4. The system of claim 1, further comprising an analytics hub in communication with the content management system and the mobile application, the analytics hub configured to receive augmented reality interaction information.

5. The system of claim 1, wherein the first value of the additional characteristic corresponds to a first information from an application or the mobile computing device when the trigger image is received, and wherein the second value of the additional characteristic corresponds to a second information from an application or the mobile computing device when the trigger image is received.

6. The method of claim 1, wherein the first value and the second value are each user-specific identifiers.

7. The system of claim 1, wherein the physical distribution item is a mail piece.

8. The system of claim 1, wherein the physical distribution item is a letter.

9. The system of claim 1, wherein the physical distribution item is a flat.

10. The system of claim 1, wherein the physical distribution item is a parcel.

11. A method of providing augmented reality content, the method comprising:
    receiving, in a mobile computing application, a scan of a physical distribution item having a trigger image disposed thereon, wherein the physical distribution item is selected from the group consisting of a mail piece, letter, flat, magazine, periodical, package, parcel, tray, container, conveyance, crate, box, and bag;
    receiving, in the mobile application, the trigger image and either a first value of an additional characteristic or a second value of the additional characteristic, wherein the first value and the second value are each user-specific identifiers
    sending the either the first or the second value of the additional characteristic from the mobile application to a content management system, the content management system including a first augmented reality content and a second augmented reality content, the first value of the additional characteristic associated with the first augmented reality content, and the second value of the additional characteristic associated with the second augmented reality content;
    receiving, in the mobile application from the content management system, an identified first or second augmented reality content based on the first or the second value of the additional characteristic; and
    displaying the identified first or second augmented reality content on the mobile application.

12. The method of claim 11, further comprising processing the trigger image to generate trigger image information, and wherein querying the memory comprises querying the memory using the generated trigger image information to identify a corresponding trigger image and associated first or second augmented reality content.

13. The method of claim 11, further comprising generating augmented reality interaction information from the mobile application.

14. The method of claim 11, further comprising delivering the physical distribution item.

15. The method of claim 11, wherein the trigger image corresponds to an environmental object, and wherein receiving the trigger image comprises receiving an image of the environmental object.

16. The method of claim 15, wherein the environmental object is a postal collection box.

17. The method of claim 11, further comprising receiving additional interaction from the user, wherein the additional interaction is viewing a web address, viewing an order form, or interactions within the augmented reality content.

18. The method of claim 11, further comprising storing analytics data in an analytics hub, the analytics data including whether the user used an interactive feature.

19. The method of claim 11, wherein the user-specific identifiers are telephone numbers.

20. The method of claim 11, wherein the physical distribution item is a mail piece.

21. The method of claim 11, wherein the physical distribution item is a letter.

22. The method of claim 11, wherein the physical distribution item is a flat.

23. The method of claim 11, wherein the physical distribution item is a parcel.

* * * * *